Nov. 18, 1969  D. A. ESTABROOKS  3,479,200
METHOD OF AND APPARATUS FOR COATING ARTICLES
Filed March 12, 1965  3 Sheets-Sheet 1
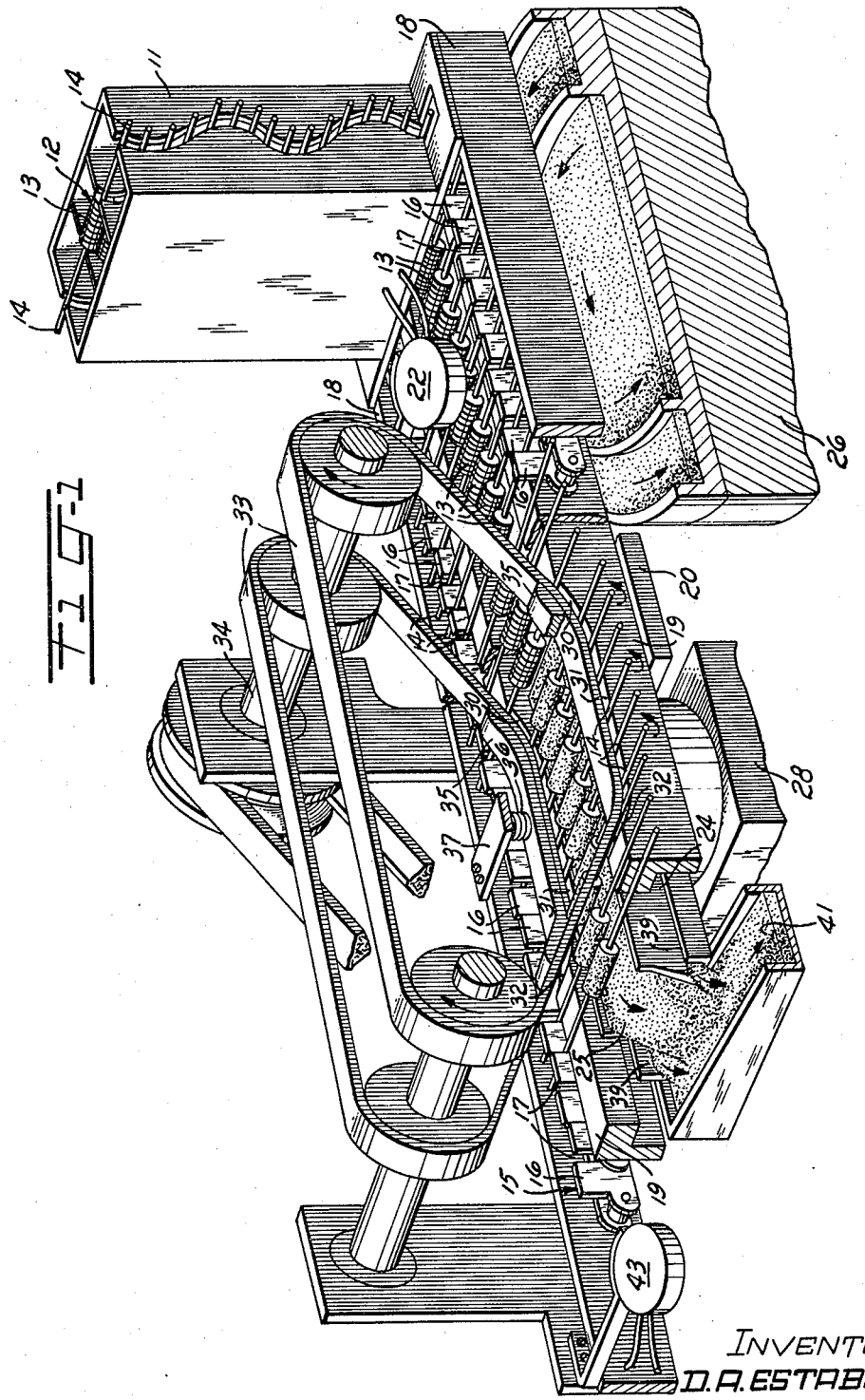
INVENTOR
D. A. ESTABROOKS
BY J. J. Lipari
ATTORNEY

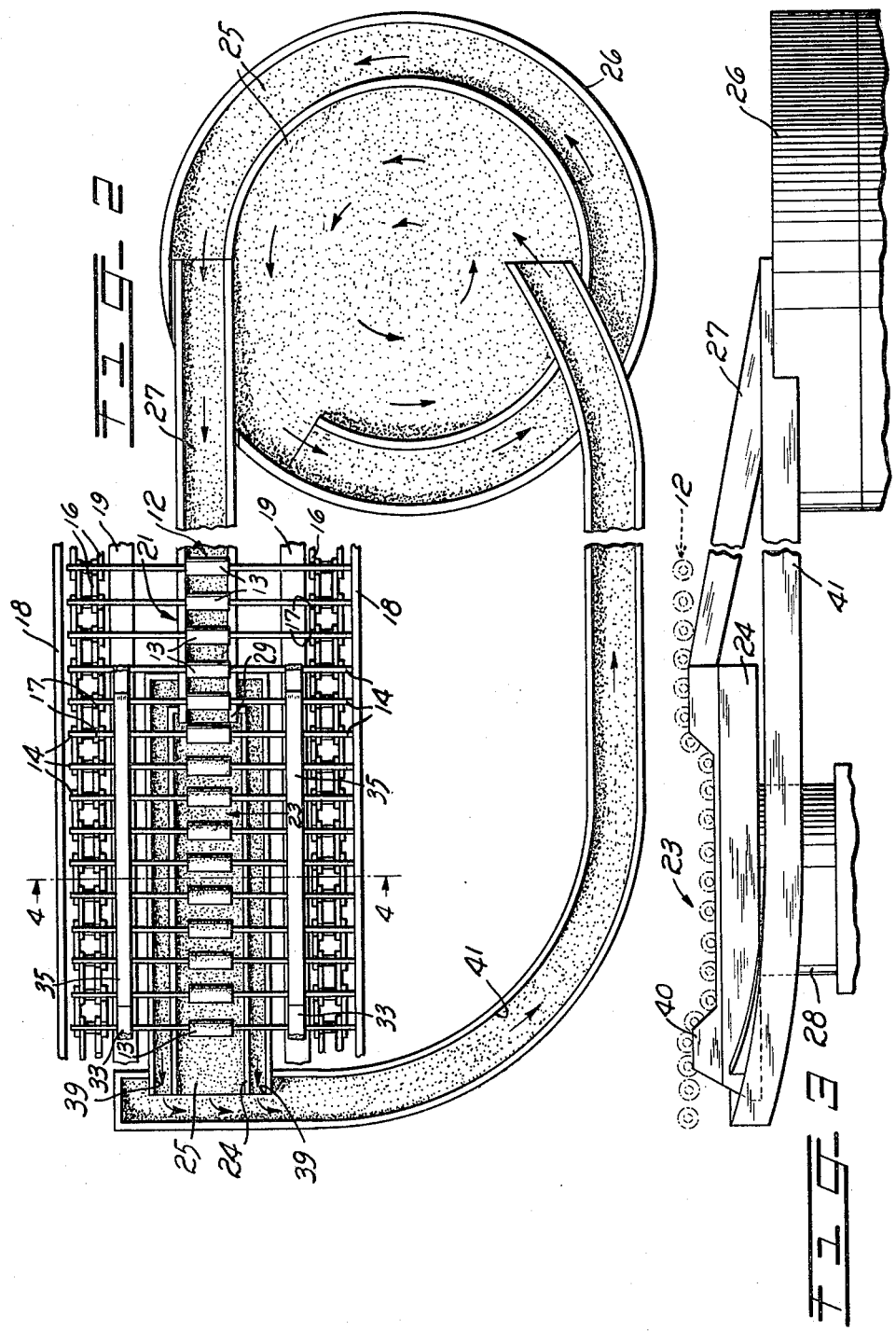

Nov. 18, 1969　　　D. A. ESTABROOKS　　　3,479,200
METHOD OF AND APPARATUS FOR COATING ARTICLES
Filed March 12, 1965　　　　　　　　　　3 Sheets-Sheet 3

United States Patent Office 3,479,200
Patented Nov. 18, 1969

3,479,200
METHOD OF AND APPARATUS FOR COATING ARTICLES
David A. Estabrooks, Newburyport, Mass., assignor to Western Electric Company, Incorporated, New York, N.Y., a corporation of New York
Filed Mar. 12, 1965, Ser. No. 439,176
Int. Cl. B44d 1/094
U.S. Cl. 117—21                                    7 Claims

ABSTRACT OF THE DISCLOSURE

Component bodies are heated, then partially submerged into and advanced with a vibratory flow of particles moving along a channel. Additional channels complete a closed path for the vibratory flow. The components are advanced by chains engaging leads extending axially from the component bodies while the leads are supported on a pair of guides. Moving belts engage the leads on the guides to rotate the advancing components. Fused particles coat the heated, rotating component bodies during their advance along the flow of particles. The coatings are then cured.

---

This invention relates to a method of and apparatus for coating articles, such as electrical components, and particularly to a method of and apparatus for applying protective coatings to electrical components, such as resistors by contact with flowing pulverulent material.

Protective dielectric coverings are applied to electronic components in order to assure adequate protection against moisture and mechanical deterioration of the component. It is also important that the coating technique should lend itself to economical automatic manufacture. Heretofore, various methods which include compression moulding, liquid plastic dipping, spraying, heat shrinkable sleeving and conventional fluidized bed processing have been used.

Generally, these methods are not only relatively costly but present certain difficulties and undesirable results. For example, where various shaped articles are to be coated, control is difficult to attain with compression moulding, liquid plastic dipping and spraying processes. Further, in liquid plastic dipping, flow control of the plastic material is critical and presents a problem with respect to the component retaining its desired shape when being removed from the plastic. In spraying methods, such as providing a shower or atmosphere of plastic particles which drop by gravity onto a passing component, not only is such a method slow but also unsatisfactory from a quality control standpoint since there is poor control of the density of the particles presented to the component which thereby produces non-uniformly coated surfaces.

In liquid plastic dipping, spraying and conventional fluidized bed methods, it is required to mask certain portions of the component, such as axially extending leads of a resistor during the coating operation. When using heat-shrinkable sleeving techniques, high labor and material costs, as well as manufacturing and quality problems, are encountered.

In addition to the required masking of components with conventional fluidized beds, the use of a plenum chamber and its associated pumps and sources of gas create undesirable cool air streams on pre-heated articles to be coated, the process also generating resin dust which requires expensive exhaust systems. Further, the required presence of gas in a fluidized bed not only results in a fluidized mixture of gas and material to be presented to the component thereby requiring additional time for the coating operation but also requires a substantial quantity of material in a receptacle to accommodate a full submersion of the component to be coated.

Accordingly, the object of this invention is a new and improved method of and apparatus for coating components uniformly, quickly, and economically.

Another object of this invention is to provide a method of and apparatus for vibrating solid particles of a coating material to cause the particles to flow and applying the flowing particles onto components.

Still another object of this invention is to provide a method of and apparatus for vibrating solid dielectric particles onto the bodies of components having axially extending leads without requiring the leads to be masked during the coating operation.

Still another object of this invention is to provide a method of and apparatus for producing an electrical component having a protective plastic coating which is relatively thin and uniformly coated thereon.

Broadly, a method according to the objects of this invention for coating articles includes heating a series of articles to a predetermined temperature, vibrating pulverulent material and causing all of the material to flow along a single prescribed path, feeding the heated articles successively along a portion of the prescribed path into contact with the flow of vibrating pulverulent material, and withdrawing the articles successively from the prescribed path.

An apparatus according to the objects of this invention includes means for heating a series of articles to a predetermined temperature, means for vibrating pulverulent material and causing all of the material to flow along a single prescribed path, means for feeding the heated articles successively along a portion of the prescribed path into contact with the flow of vibrating pulverulent material, and means for withdrawing the articles successively from the prescribed path.

Other objects and advantages of the invention will become apparent and a fuller understanding of the invention may be had by referring to the following description and claims, taken in conjunction with the accompanying drawings, in which:

FIG. 1 is an isometric view of the apparatus depicting the advancing, heating and coating of the component;

FIG. 2 is a plan view of the apparatus and includes the directional flow of the coating particles;

FIG. 3 is a partial side elevational view of FIG. 2;

Figure 4:
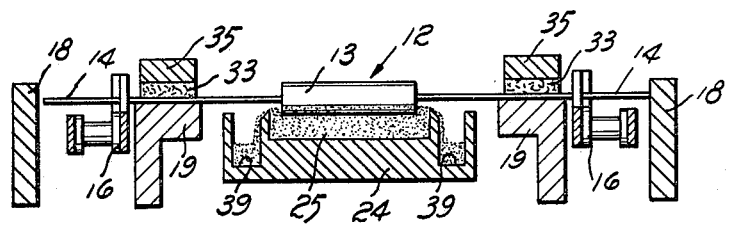
FIG. 4 is a partial cross-sectional view of the apparatus taken along lines 4—4 of FIG. 2 depicting the surface of a resistor body immersed in the coating particles during its rotational advance therethrough.

With reference to the drawing, FIG. 1 depicts an apparatus provided with a feeding magazine 11 for feeding resistors 12 of the type having a body 13, consisting of a ceramic core having either a carbon coating thereon with a resistance path therein or a wire wound thereabout, and axially extending leads 14—14 therefrom. The resistors 12 are fed from the magazine 11 through a conventional type escapement (not shown) onto an endless conveyor 15 having a pair of parallel link-chains 16—16. The resistor leads 14—14 are received within respective areas 17—17 formed by the link-chains 16—16 which are driven at a constant velocity by conventional drive means (not shown). The resistor bodies 13 are centered by guide rails 18—18 disposed external the link-chains 16—16 which contact the ends of the leads 14—14. A pair of heat conducting bars 19—19 extend internal the link-chains 16—16 and support the resistor leads 14—14. The conducting bars 19—19 can be heated by suitable means, such as an induction or resistance heater 20, for purposes to be described hereinafter. The conveyor 15 advances the resistors 12 through a pre-heating zone 21 whereat heat is emitted from a source 22, such as a radiant lamp, and concentrated onto the resistor bodies 13.

The heated resistors 12 are then advanced to a coating area 23 which includes a longitudinally extending trough 24 disposed between the conducting bars 19—19. Particles 25 of a plastic material, such as epoxy resin to be described in more detail hereinafter, are fed from a centrifugal vibrator 26 (FIGS. 1, 2 and 3) along a relatively steep inclined ramp 27 and into the trough 24 which is linearly vibrated independently of the centrifugal vibrator by a vibrator 28 to advance the particles in the trough in a direction indicated by the arrows. The vibrators utilized may be of the type manufactured by the Syntron Company, Homer City, Pa. As seen in FIG. 2, there is an overlap of the ramp end 29 with the trough 24, in the direction of the particle flow, without any physical contact therebetween so as to avoid any damping effects on the particle flow.

The resistors 12 are advanced toward the coating area 23 after being pre-heated, the conducting bars 19—19 in contact with the resistor leads 14—14 preventing any substantial heat loss from the resistor bodies before and during the ensuing coating operation. At the point where the resistors enter the coating area 23 (FIG. 1), the contour of the respective conducting bars 19—19 slopes downwardly at 30—30, extends linearly at 31—31, and then slopes upwardly at 32—32 to its normal height, the overall contour thereby taking the form of a dish-like bowl in longitudinal cross-section. As seen in respective FIGS. 4 and 5, the relative position of the height of the conducting bars at 31—31 with respect to the trough 24 is such that successively fed resistor bodies 13 extend either substantially tangential with or just slightly beneath the surface of the linearly flowing particles 25 vibrating in the trough 24.

Simultaneously, as the resistor bodies are lowered into the trough 24 at 30—30, the resistor leads 14—14 are engaged by respective endless belts 33—33, comprised of a frictional material such as rubber. The endless belts 33—33 are rotatably driven through a shaft 34 by conventional means (not shown) in synchronization with the velocity of the link-chains 16—16 and cause a positive rotation of the resistor bodies as they are moved along the conducting bars 19—19 at 30—30, 31—31, and 32—32. The belts 33—33 are urged into contact with the resistor leads 14—14 by pressure plates 35—35, each exerting a downward force on its respective endless belt 33 through springs 36 (only one being shown in FIG. 1) extending from supporting element 37. For uniform coating it is essential that the endless belts 33—33 initially impart rotational movement to the resistor bodies 13 just prior to their entry into the particle flow at 30—30 so that no particles will accumulate on any one side of the resistor bodies 13. Likewise, continued rotation along the conducting bars at 32—32, after coating, insures a constant flow of the particle coating on the resistor bodies 13 until a curing or thermosetting of the particles commence. Preferably, the resistor bodies 13 are caused to rotate in a direction opposite to that of the vibrating flow of the particles 25, as shown; however, if desired the resistor bodies may be rotated in the same direction as the vibratory flow of the particles merely by changing the directional drive of the vibratory flow of particles in the trough 24.

As seen in FIG. 3, the bottom surface of the trough 24 is inclined upwardly near its downstream end 40 providing an effect similar to a dam, so as to build up a back pressure on the vibratory particles to insure a reservoir thereof in the coating area of the trough. The depth of the particle flow in the coating area 23 is fairly shallow, preferably, about 1/8 of an inch. Obviously, the depth can be varied in accordance with the type of coating particles being utilized, the type of component being covered, the desired thickness of the coating and the required time and temperature relationship of the coating. It has been found, however, that as the depth of the particle flow is decreased, there is an increased velocity of the particle flow near the top surface thereof which is desirable since it is those particles which are presented to the heated bodies 13. With a maximum velocity of particle flow near the top surface thereof, there is assurance that a sufficient density of particles will be present for each succeeding resistor body 13 continuously passing therethrough. In other words, substantially the same amount of particles is presented to each segment of the rotating circumferential portion of the resistor body 13, thereby assuring a uniform coating on the resistor body.

Figure 5:
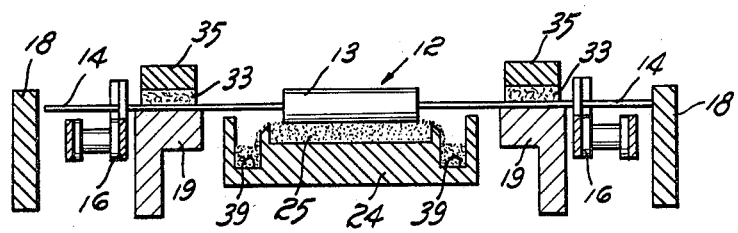
FIG. 5 is an alternate embodiment of FIG. 4 depicting the surface of a resistor body tangentially contacting the coating particles during its rotational advance therethrough.

As seen in FIGS. 1, 4, and 5 the trough 24 is provided with externally disposed laterally extending channels 39—39 for receiving and transporting the overflow particles to the downstream end 40 of the trough whereat all the unused particles accumulate. The accumulated particles are caused to flow onto a return conveyor 41 which may be directly connected to and thereby vibrated by the centrifugal vibrator 26 for returning the unused particles thereto. If desired, however, the return conveyor 41 simply may overlap the centrifugal vibrator at its terminal portion and thereby be driven independently of the centrifugal vibrator 26.

Figure 6:
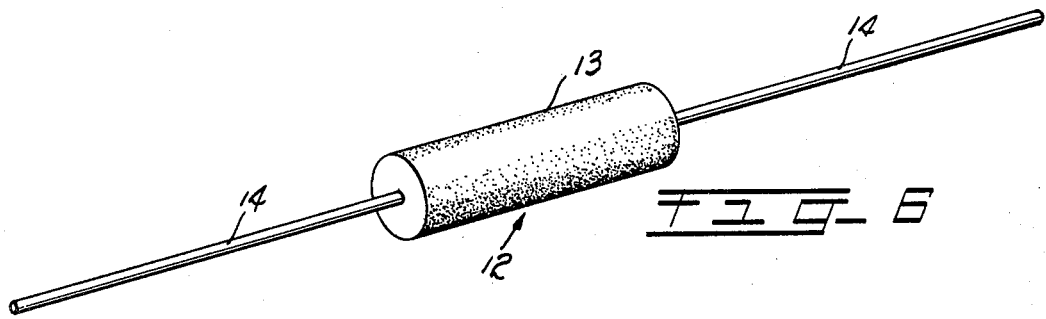
FIG. 6 is an isometric illustration of a resistor coated according to the apparatus shown in FIG. 5.
Figure 7:
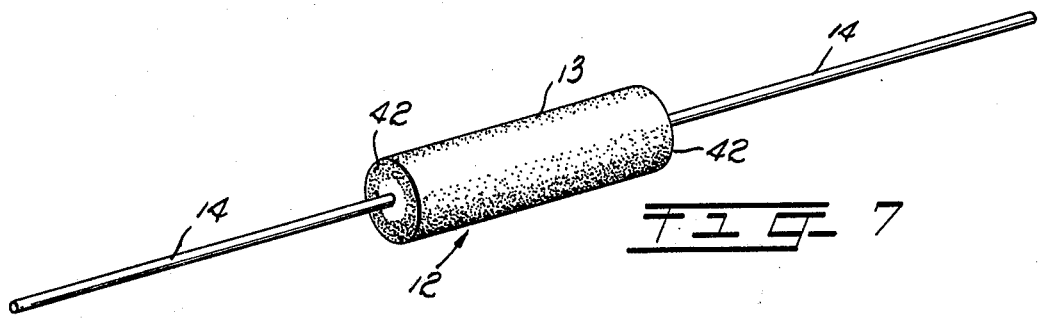
FIG. 7 is an isometric illustration of a resistor coated according to the apparatus shown in FIG. 4.

During the passage of the resistor bodies 13 through the flow of particles 25, the outer peripheral surface of the bodies extend a predetermined depth within the particle flow, as seen in FIGS. 3 and 4. It should be noted that the term predetermined depth, as used herein, is defined to include either a tangential contact or a submersion of the resistor body with respect to the flow of particles. Illustrations of the resultant coated resistors in both instances are shown in FIGS. 6 and 7, respectively. The axially extending leads 14—14, rotatably traveling along the top surface of the conducting bars 19—19 are free from contact with the particle flow and, therefore, are not required to be masked for the coating operation. Accordingly, in a preferred embodiment where the resistor body passes just beneath the top surface of the vibratory flow, as the outer peripheral surface of the resistor body 13 is being coated, a small portion of the respective end surfaces 42—42 (FIGS. 4 and 7) advantageously is contacted by the vibratory flow of particles 25 thereby insuring a complete encapsulation of the outer peripheral surface without any further coating on the end surfaces 42—42 or axially extending leads 14—14. Thus, as the pre-heated resistor bodies contact the vibratory flow of solid particles 25, the particles melt, flow to a controlled extent, then partially cure and bond to said aforementioned resistor surfaces and coalesce into a smooth, uniform coating.

After the component bodies are coated, they are advanced to a post heating zone whereat a suitable heat source 43, such as a radiant lamp, is provided to concentrate heat on and cure the particle coating. If desired, the coated components can pass through an oven for curing.

With respect to the required temperatures for pre-heating the components and curing the coatings thereon, such is dependent upon the particle material utilized, and the heat capacity and shape of the component body being coated. Such data is essential since the thickness of the coating is determined by the pre-heat temperature and the length of time in which the component body passes through the particles 25. It has been found that for coating carbon deposited resistors, wire wound resistors or like electrical components, that particles of a plastic material, such as polyethylene, polyester and certain epoxy resins are preferred. For example, Scotchcast #262 epoxy resin, manufactured by Minnesota Mining and Manufacturing Company, has been found to be quite effective when utilized with this vibratory flow method and provides an excellent moisture and chemical resistant dielectric coating for a variety of electrical components.

Resistors have been coated successfully according to the aforementioned vibratory flow method with epoxy resin. Coatings having a thickness of .007" to .030" and greater have been uniformly applied to the resistors. To obtain such thickness coatings, the resistor bodies 13 are heated at the pre-heating zone to a temperature ranging between 225° F. to 425° F. and thereafter contact the particles for a time interval ranging from 40 seconds to 5 seconds, respectively. For example, in one type resistor, a coating required to have a thickness of .025 inch is preheated at 325° F. and in contact with the flow of particles for 20 seconds. As previously mentioned, the resistor bodies maintain their required temperatures for fusing due to the heating bars 19—19 which are heated to and controlled at said required temperatures by heater 20.

The curing of the epoxy coating to a thermoset condition is a time-post-heat temperature relationship. Thus, after the resistor body is coated and passes on to the post heating station, it may be subjected to a temperature ranging between 300° F. and 450° F. for a period of time ranging from 120 seconds to 10 seconds, respectively, to fully cure the coating. In this connection, the resistor, previously selected to have a .023 inch thickness coating thereon, may be heated to a temperature of 325° F. for 20 seconds to fully cure the coating.

If desired, the component body may only be substantially cured, i.e., to a tough, non-brittle, unfusible state, so that the resistor can be removed to another machine for performing other operations thereon, such as stamping and testing. In such an event, the coating of the resistor may be heated to a temperature ranging from 300° F. to 450° F. for a period of time ranging from 90 seconds to 5 seconds, respectively. Any additional curing required may take place subsequent to such other operations performed either by additional heating, standing for a period of time at room temperature, or when the component is put into its intended use.

Although this invention has been described with a certain degree of particularity, it is understood that the present disclosure has been made only by way of example and that numerous changes in the details of construction and the combination of arrangements of parts may be resorted to without departing from the spirit and scope of the invention as hereinafter claimed. For example, while the invention has been applied particularly to coating the circumferential body of a resistor with either no coating or only a partial coating being applied to the end surfaces of the body, it can be appreciated that more than half the body can be immersed in the vibrating flow of coating particles during its rotational advance therethrough to coat the end surfaces in their entirety. It is also to be understood that articles other than the type described, may be coated according to this invention and that temporary supporting elements, if required, be attached to said other articles for facilitating their advance through the vibrating flow of coating particles.

What is claimed is:

1. Apparatus for coating successive components each having a body portion and leads extending axially from opposed ends of the body portion, which comprises
   means for heating the components to at least the fusion temperature of particles for coating the components,
   trough means for receiving the coating particles to a predetermined height for fusing, adhering to and coating the body portions of the heated components, said trough means including means for maintaining said predetermined height of particles during movement of the particles along the trough means,
   a pair of guides mounted adjacent the trough means and extending in parallel relationship at opposed sides of the trough means for supporting upon top surfaces of both guides the respective axially extending leads of the components with the body portions of the components disposed at least partially within the trough means above said predetermined height of particles, said guides being recessed along coextensive longitudinally extending portions of said top surfaces of both guides adjacent the trough means to a depth selected to contact at least a segment of the body portion of each component having its axially extending leads supported on the guides along the recesses with particles in the trough means at said predetermined height,
   means cooperable with said particle height maintaining means for vibrating the trough means and imparting vibratory movement to the particles to flow in a mass extending just to said predetermined height within the trough means,
   means mounting the components to move freely downwardly to said selected depth as the axially extending leads traverse the recesses in the guides for continuously advancing the components in succession from the heating means to position the axially extending leads upon said top surfaces of both guides and further advancing the components across the trough means and the guides with the body portions of the components disposed at least partially within the trough means at said selected depth as the axially extending leads traverse the recesses in the guides, and
   means extending downwardly into, and shaped to cooperate with, the recesses in both guides for rotating the advancing heated components along the length of the recesses so as to present successive segments of each rotating body portion into contact with the flow of vibrating particles.

2. Apparatus according to claim 1 wherein the recesses in the guides adjacent the trough means extend to said selected depth with respect to said predetermined height of the vibratory flow of particles therethrough such that an outer surface and only a portion of the opposed ends of each component body portion contact said particle flow.

3. Apparatus according to claim 1, wherein said trough means has an upstream and a downstream end, as defined by a direction of particle flow and component advancement, and includes a pair of upwardly extending inner walls defining therebetween a passageway extending to said downstream end of the trough means for directing flowing particles along the passageway toward the downstream end of the trough means, the apparatus further including:
   means cooperative with said vibrating means for supplying particles to a location with said passageway adjacent the upstream end of the trough means,
   channel means included in said trough means extending parallel to said inner walls and positioned outwardly and downwardly therefrom for receiving overflow from said passageway of particles at a height above the height of the inner walls, said means for vibrating the trough means constituting means operable at a selected frequency and amplitude for flowing both particles for coating the component body portions along said passageway and overflow particles along said channel means in a direction toward the downstream end of the trough means, and
   means extending from the downstream end of the trough means to the supplying means for returning unused particles from both the passageway and the channel means at said downstream end of the trough means to the supplying means.

4. Apparatus for coating components, in accordance with claim 1, wherein said particle height maintaining means comprise:
    means located in the trough means downstream of the recesses in the guides in a direction of particle flow for applying to the flowing particles in the trough means a back pressure selected to maintain said predetermined height of particles.

5. Apparatus for coating components, in accordance with claim 4, wherein said back pressure applying means comprise:
    means projecting upwardly from the bottom of the trough means downstream of the recesses in the guides for damming the flow of particles upstream thereof.

6. Apparatus for coating successive components each having a generally cylindrical body portion and leads extending axially from opposed ends of the body portion, which comprises:
    a pair of guides having top surfaces extending in parallel relationship and spaced so as to support the components by contact of the top surfaces with the respective axially extending leads at the opposed ends of the components,
    means for heating the components to a temperature selected to fuse particles of a coating material,
    means for continuously advancing successive components from the heating means and across the guides,
    trough means extending parallel to and between the guides at a selected distance below the top surfaces of the guides for receiving particles of the coating material to coat the heated component body portions extending downwardly between the guides to a predetermined depth in the trough means defined by said selected distance, said trough means including a damming member positioned near the downstream end thereof and shaped to provide a predetermined height of flow to particles received in the trough means and caused to flow by vibration of the trough means at a predetermined frequency and amplitude selected such that at least a circumferential segment of the body portion of each of the components at said predetermined depth will be contacted by the flowing particles at said predetermined height,
    means for vibrating the trough means at said predetermined frequency and amplitude to impart vibratory movement to the particles to flow to said predetermined height along the trough means adjacent the advancing components on the guides, and
    means for rotating the advancing heated components while the body portions of the components are in contact with the flow of vibratory particles at said predetermined height so as to present successive circumferential segments of each body portion thereto for enabling the particles to uniformly contact, fuse and, thus, coat at least the entire radially outermost surface of said component body portions.

7. The method of coating articles which comprises:
    heating a series of articles to a temperature selected to fuse a pulverulent coating material,
    flowing the pulverulent material along a single prescribed closed path by imparting vibratory energy to the pulverulent material along the closed path while guiding the vibrating material along the path,
    applying a predetermined back pressure to the flow of vibrating pulverulent material at a selected first point along the closed path, the predetermined back pressure being selected to afford a predetermined height to the flow of material for a distance along the path upstream of the first point to at least a selected second point,
    feeding the heated articles successively along a path parallel to a portion of the prescribed closed path extending from said second point to said first point with the path of the heated articles selected to immerse the articles to a desired depth of coating into the flow of vibrating pulverulent material extending to said predetermined height for fusing the pulverulent coating material to adhere to the articles to said desired depth of coating, and
    withdrawing the articles successively from said parallel path.

References Cited
UNITED STATES PATENTS

| | | | |
|---|---|---|---|
| 2,513,434 | 7/1950 | Tinsley | 117—21 |
| 2,579,727 | 12/1951 | Carpenter | 117—18 |
| 2,760,229 | 8/1956 | Cheney et al. | 117—21 |
| 2,879,179 | 3/1959 | Wiley | 118—416 X |
| 2,995,482 | 8/1961 | Boyce et al. | 117—21 X |
| 3,024,133 | 3/1962 | White | 118—57 X |
| 3,032,816 | 5/1962 | Zimmerli | 117—21 X |
| 3,039,283 | 6/1962 | Buscemi | 117—18 X |
| 3,254,625 | 6/1966 | Armstrong | 117—21 X |
| 3,310,431 | 3/1967 | Loose | 117—21 X |

WILLIAM D. MARTIN, Primary Examiner

P. ATTAGUILE, Assistant Examiner

U.S. Cl. X.R.

118—57. 416, 423